United States Patent [19]
Fournier

[11] 3,940,152
[45] Feb. 24, 1976

[54] PNEUMATIC SEAL
[75] Inventor: Jean Fournier, Chatou, France
[73] Assignee: Le Joint Francais, Paris, France
[22] Filed: Aug. 1, 1974
[21] Appl. No.: 493,947

[30] Foreign Application Priority Data
Sept. 6, 1973   France .............................. 73.32157

[52] U.S. Cl. ................................................. 277/34
[51] Int. Cl.² ........................................... F16J 15/46
[58] Field of Search ........... 277/34, 34.3, 34.6, 226, 277/237

[56]  References Cited
UNITED STATES PATENTS
2,720,011   10/1955   Krupp ................................... 277/34
3,262,707   7/1966   Williams .......................... 277/34.3

Primary Examiner—Robert I. Smith
Attorney, Agent, or Firm—Sughrue, Rothwell, Mion, Zinn & Macpeak

[57] ABSTRACT

Pneumatic seal consisting of a flattened casing forming a base onto which are folded back symmetrically double thickness of two lateral walls. Such a seal has, in the "rest" position, a cross-section having a very slight height and, in the "inflated" position, a cross-section in height greater than that of known seals. Such a seal is intended to provide sealing between mobile elements belonging to sealed enclosures, for example at the level of the doors of those enclosures.

8 Claims, 8 Drawing Figures

PNEUMATIC SEAL

BACKGROUND OF THE INVENTION

Field of the Invention

The present invention concerns an inflatable and deflatable seal.

Such a seal is intended to ensure sealing between two surfaces, that is, to prevent the ingress of any solid or of any fluid between those two surfaces.

The problem is particularly delicate when these surfaces must be made mobile with respect to each other. An inflatable and deflatable seal then constitutes an effective system, for all that is needed is a simple variation in the pressure of a fluid inside the seal to break or make, durably, fluid-tight sealing between two surfaces even if they have surface defects or great irregularities in planeness.

Inflatable and deflatable seals, consisting of profiled bars made of an elastic material provided with inflation connections linking them to a suitable pneumatic system have already been used in the branch of aeronautical, naval, nuclear and mechanical industries. These profiled bars generally have a U-shaped cross-section whose base may be fixed by cementing or any other mechanical means, on one of the two surfaces to be brought into contact or, the more often, in a groove in that surface.

A profiled bar of the preceding type is generally defined by the ratio $H/h$, $H$ being the height of its transversal cross-section in the inflated state and $h$ being the height of its transversal cross-section in the rest state. It is required to obtain a low value for $h$, that is, a slight bulk of the deflated seal and of the recess which is necessary for it; moreover, it is an advantage to have available seals having a great height $H$, to bring two surfaces spaced very far apart together. Now, pneumatic seals known up till now make it possible to obtain a value of the ratio $H/h$ equal at most to 2 and the more often in the order of 1.6 to 1.85.

The aim of the present invention is to produce a pneumatic seal whose shape is such that the value of the ratio $H/h$ may be very much greater than 2.

SUMMARY OF THE INVENTION

The present invention has for its object an inflatable and deflatable pneumatic seal consisting of a profiled casing made of an elastic material, characterized in that, in the deflated position, the said casing is flattened so as to form a base and at least one lateral wall folded back onto the base.

According to an embodiment which is a great advantage, the casing has two lateral walls folded back symmetrically onto its base.

According to a variant of embodiment, the lateral walls are folded back twice onto the base of the seal.

In a general way, the width $L$ of that base is greater than or equal to $0.785 H$.

BRIEF DESCRIPTION OF THE DRAWINGS

Other characteristics and advantages of a seal according to the invention will become apparent from the following description which will be given with reference to the accompanying drawing, given by way of an illustration but having no limiting character and in which.

DESCRIPTION OF PREFERRED EMBODIMENTS

Figure 1A:
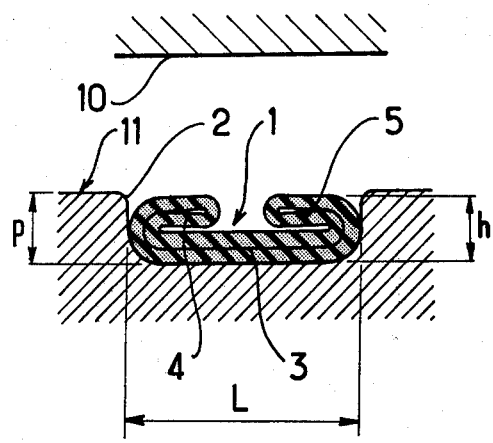
FIGS. 1a and 1b are diagrammatic cutaway views of a seal according to the invention, respectively in the deflated position and in the inflated position.

The seal shown in the rest position in FIG. 1a is constituted by a casing 1, made of a material basically containing synthetic rubber or an elastomer, obtained by extrusion, having, or not having, walls reinforced by polyamide tissues. The casing 1 is flattened so as to form a base 3 having a width L onto which are folded back its two lateral walls 4 and 5; the total height of the transversal cross-section of the seal, referenced $h$, is only very slightly greater than four times the thickness of the wall of the casing, this not being the case with known pneumatic seals. The seal rests by its base 3 on the bottom of a recess 2 whose depth is $p$, $p$ being, to great advantage, slightly greater than $h$. The base 3 is fixed to the recess 2 generally by cementing, the cementing products preferably containing basically rubber which is self-vulcanizing at ambient temperature.

The recess 2 is formed in a wall 11 intended to be brought into contact with a wall 10 in a fluid-tight manner and shown diagrammatically at the instant when it is adjacent to the latter.

Figure 1B:
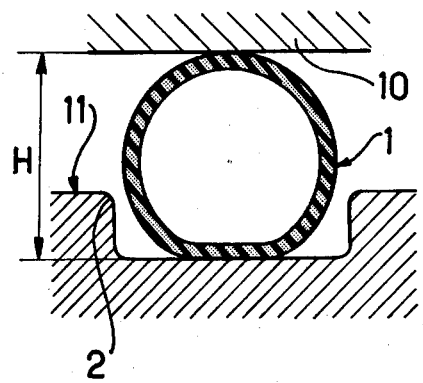

FIG. 1b shows the seal in FIG. 1a in the expanded position enabling the walls 10 and 11 to be brought into contact with one another in a fluid-tight manner; the casing 1 then has a substantially circular cross-section, having a maximum height referenced H, the width L and the height H being connected related by the equation $L \geq 0.785 H$.

It is observed that a seal having the preceding characteristics has, in the rest position, a smaller height $h$ and therefore requires a recess having a slighter depth p in which a conventional seal could not be installed.

Moreover, the folded back structure of that seal makes it possible to obtain ratios $H/h$ whose value is greater than 7, that value being limited only by the value of L, that is, the bulk of the width of the base of the seal.

When the seal is in the rest position, it takes up a minimum volume and it is possible to maneuver the wall 10 in relation to the wall 11; when the seal is in the expanded position after a fluid has been allowed to enter inside the casing and has caused its full development, it enables the blocking of the relative movements of the two walls and the complete stopping up of the free space between these walls. Sealing is provided by means of the elasticity of the material of which the seal is made and also by means of the force of application of the seal which, at the time of the letting in of the fluid, is applied vigorously against the wall 10 opposite to its base. As soon as the feeding of the seal with fluid is stopped, it resumes its rest position and the relative moving of the mobile walls 10 and 11 again becomes possible.

Figure 2:
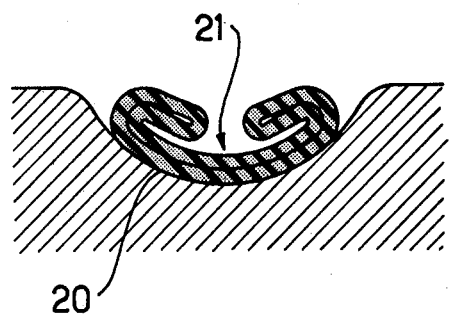
FIGS. 2 and 3 are diagrammatic cutaway views of two seals according to the invention arranged respectively in a circular recess and in a recess having an angled cross-section.
Figure 3:
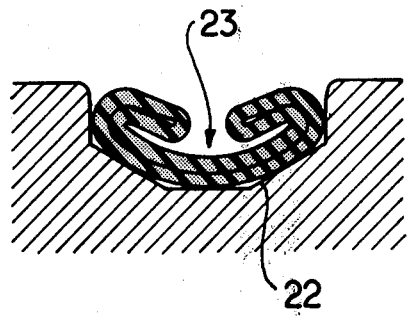

FIGS. 2 and 3 show seals 21 and 23, analogous to that in FIG. 1a, in the rest position, applied against the bottom of grooves having respectively a semi-circular cross-section 20 and a cross-section 22 with angular cut faces. In these two cases, fixing may be effected by cementing or by any other appropriate mechanical means.

Figure 4:
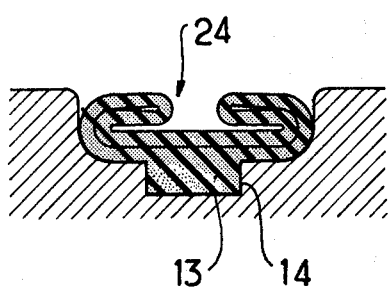
FIGS. 4 and 5 are two variants of heel type seals according to the invention.

FIG. 4 shows a seal 24 whose base is provided with a rectangular heel 13 co-operating with a cavity 14 formed by the recess of the seal support.

Figure 5:
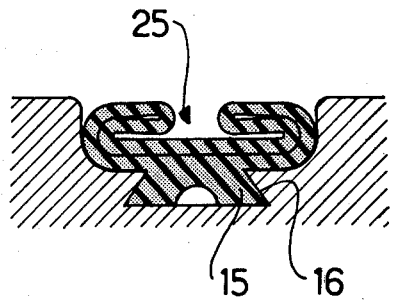

FIG. 5 shows a seal 25 whose base has a dovetail heel 15 cooperating with an appropriate cavity 16 formed by the groove of the seal support.

It must be understood that these variants of embodiment are given only by way of examples.

Figure 6:
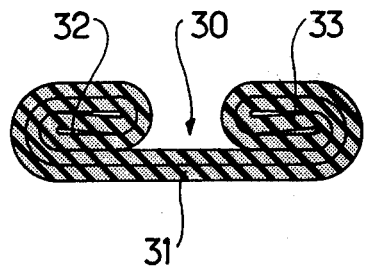
FIG. 6 is a diagrammatic cutaway view of a variant of a seal whose casing has two lateral walls folded back twice onto its base.

FIG. 6 is a cutaway view of a variation of embodiment which has a particular advantage, for it makes it possible to obtain, for a same lateral bulk, a greater development of the seal; in other words, a greater value of H for a same value of L.

The double flattened casing of the seal 30 has a base 31 and two lateral walls 32 and 33 folded back twice onto the base 31. The folds are formed, in this particular case, in a symmetrical way in relation to the axis of the covering.

Figure 7:
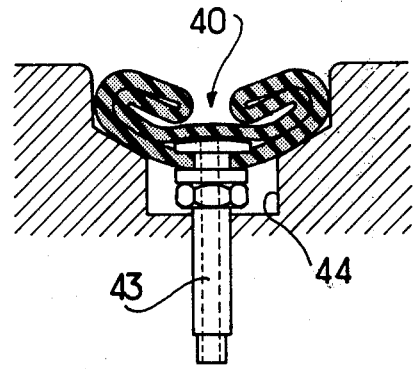
FIG. 7 is a diagrammatic cutaway view of a seal in its groove connected with a valve.

FIG. 7 shows diagrammatically a cutaway view of a seal 40 provided with an expansion connection 43, whose valve is screwed into the bottom of the recess 44 of the seal and which is connected to an appropriate pneumatic system. The expansion connection may also be arranged on one side of the seal.

A seal according to the invention makes is possible to provide fluid-tight sealing in all the types of fluid-tight compartments, for example at the level of the sliding doors in nuclear enclosures. In all of the embodiments, the top of the casing of the seal is collapsed on its base and double thicknesses of the lateral sidewalls are folded in towards themselves and down on the collapsed top, while in the embodiment of FIG. 6 the double thicknesses of the lateral sidewalls are first folded in towards themselves and then reversely folded at their terminal ends away from each other and down on the collapsed top.

The invention is in no way limited to the embodiments described and illustrated, which have been given only by way of examples. More particularly, without going beyond the scope of the invention, certain arrangements may be changed or certain means may be replaced by equivalent means.

I claim:

1. In an inflatable and deflatable pneumatic seal consisting of a profiled casing made of an elastic material, the improvement wherein in the deflated condition, the casing comprises a flat base, a top collapsed on said base and at least one double thickness lateral sidewall which is at least folded in and down on the collapsed top.

2. The pneumatic seal according to claim 1, wherein the double thickness of the lateral wall is folded back twice onto said collapsed top.

3. The pneumatic seal according to claim 1, wherein the width L of the base is greater than 0.785 H, with H being the height of the transversal cross-section of the inflated seal.

4. The pneuatic seal according to claim 1, wherein the casing has, in deflated condition, two lateral walls folded back symmetrically onto the said base.

5. The pneumatic seal according to claim 2, wherein the casing has, in deflated condition, two lateral walls folded back symmetrically onto the said base.

6. The pneumatic seal according to claim 3, wherein the casing has, in deflated condition, two lateral walls folded back symmetrically onto the said base.

7. The pneumatic seal according to claim 3, wherein the ratio of $H/h$ is greater than 2; with $h$ being the height of the seal transversal cross-section in the deflated condition.

8. The pneumatic seal according to claim 6, wherein the ratio of $H/h$ is greater than 2, with $h$ being the height of the seal transversal cross-section in the deflated condition.

* * * * *